United States Patent
Lawson-Jenkins et al.

[11] Patent Number: 6,157,833
[45] Date of Patent: Dec. 5, 2000

[54] METHOD FOR REDUCING STATUS REPORTING IN A WIRELESS COMMUNICATION SYSTEMS

[75] Inventors: Kim Lawson-Jenkins, Germantown, Md.; Robert Perez; Marilyn Rochelle Escue, both of Bloomingdale, Ill.; Christopher Robert Schmidt, Wheaton, Ill.; Timothy L. Moran, Island Lake, Ill.

[73] Assignee: Motorola, Inc., Schaumburg, Ill.

[21] Appl. No.: 08/970,444

[22] Filed: Nov. 14, 1997

[51] Int. Cl.[7] .................. H04Q 7/20; H04B 1/38
[52] U.S. Cl. ............ 455/436; 455/432; 455/456; 455/560
[58] Field of Search ..................... 455/436, 445, 455/524, 525, 560, 67.7, 456; 445/434, 433, 432, 561, 458

[56] References Cited

U.S. PATENT DOCUMENTS

| | | | |
|---|---|---|---|
| 5,329,635 | 7/1994 | Wadin et al. | 455/33.2 |
| 5,390,339 | 2/1995 | Bruckert et al. | 455/33.2 |
| 5,471,644 | 11/1995 | Schatz et al. | 455/33.2 |
| 5,475,689 | 12/1995 | Kay et al. | 370/95.3 |
| 5,519,758 | 5/1996 | Tabbane | 379/59 |
| 5,561,840 | 10/1996 | Alvesalo et al. | 455/33.1 |
| 5,577,029 | 11/1996 | Lu et al. | 370/54 |
| 5,600,708 | 2/1997 | Meche et al. | 379/59 |
| 5,657,373 | 8/1997 | Hermansson et al. | 455/435 |
| 5,793,752 | 8/1998 | Clarke et al. | 370/252 |
| 5,889,770 | 3/1999 | Jokiaho et al. | 370/337 |
| 5,905,952 | 5/1999 | Joensuu et al. | 455/433 |
| 5,958,080 | 9/1999 | Kang | 714/807 |

FOREIGN PATENT DOCUMENTS

WO96/22666   7/1996   WIPO.

OTHER PUBLICATIONS

ETSI Digital Cellular Telecommunications System (Phase 2); Mobile–Services Switching Centre–Base Station System (MSC–BSS) Interface Layer 3 specification (GSM 08.08), pp. 1–101, Sep. 1996.

Primary Examiner—Daniel S. Hunter
Assistant Examiner—Meless Zewdu
Attorney, Agent, or Firm—Kenneth A. Haas

[57] ABSTRACT

The method for reducing status reporting in a wireless communication system (100), such as a code division multiple access wireless communication system is described. Wireless communication system (100) includes a mobile switching center (202), a base station controller (204), and a plurality of base transceiver stations (240–242). The method includes wireless communication system (100) receiving a mobile communication signal (115) from a mobile station (220), and based on the mobile communication signal (115), invoking delivery of an information element (230) to base station controller (204). The method further includes, based on information element (230), selectively forwarding by base station controller (204) a status message to mobile switching center (202). In addition, the method includes acknowledging, by base station controller (204), successful receipt of information element (230).

4 Claims, 6 Drawing Sheets

| 7 | 6 | 5 | 4 | 3 | 2 | 1 | 0 | OCTET |
|---|---|---|---|---|---|---|---|---|
| INFORMATION ELEMENT IDENTIFIER ⟵405 | | | | | | | | 1 |
| LENGTH ⟵409 ⟵410 ⟵411 ⟵412 406⟶ 407⟶ 408⟶ | | | | | | | | 2 |
| MBA CHANGE | MSA CHANGE | WIRE TAP | E911 | SECTOR CHANGE | CELL CHANGE | NEVER SEND | ALWAYS SEND | 3 |
| SPARE 413 | REF SECTOR 414 | REF CELL 415 | TIMER 416 | DISTANCE 417 | LOCATION AREA 418 | SID CHANGE 419 | NID CHANGE 420 | 4 |
| PRIVATE USE 421 | PRIVATE USE 422 | PRIVATE USE 423 | PRIVATE USE 424 | PRIVATE USE 425 | SPARE 426 | SPARE 427 | SPARE 428 | 5 |
| EXT | DISTANCE PARAMETER (METERS) | | | | | | | 6 |
| EXT | TIMER PARAMETER (SECONDS) | | | | | | | 7 |

METHOD FOR REDUCING STATUS REPORTING IN A WIRELESS COMMUNICATION SYSTEMS

FIELD OF THE INVENTION

The present invention relates generally to wireless communication systems and, more particularly, to a method for reducing status reporting within a wireless communication system.

BACKGROUND OF THE INVENTION

Communication systems that utilize coded communication signals are known in the art. One such system is a direct sequence code division multiple access (DS-CDMA) cellular communication system, such as set forth in the Telecommunications Industry Association Interim Standard 95A (TIA/EIA IS-95A) herein after referred to as IS-95A, incorporated herein by reference. In accordance with IS-95A, the coded communication signals used in the DS-CDMA system comprise signals that are transmitted in a common 1.25 MHz bandwidth to base sites of the system from communication units, such as mobile station or portable radiotelephones, that are communicating in the coverage areas of the base sites.

Signaling communication from mobile stations to the wireless communication system occurs via messages. Messages are used, for example, during call establishment and control, radio resource management, mobile station handoff, mobility management, and base site management. Messages from the mobile stations to a mobile switching element, herein referred to as a mobile switching center (MSC) are routed through the base sites. In addition, messages are sent exclusively between the base sites and the MSC, and between the base sites and the mobile station. Signaling communication between base sites and their associated MSC is typically performed using TIA Interim Standard 634 (IS-634) protocol as defined in TIA/EIA IS-634, MSC-BS Interface for Public 800 MHz, Dec. 18, 1995.

With the introduction of new subscriber features and services, status reporting via the use of signaling messages between the MSC and base sites has increased and system performance has been degraded. For example, location based services such as Emergency 9-1-1, services associated with administering the Communication Assistance for Law Enforcement Act (CALEA) Lawful Authorization Electronic Surveillance (LAES) or wiretap, as well as multiple billing areas, or limited service areas have contributed to the added message load. In addition, inter- and intra-base site handoff, and soft handoff messages, have further increased the message load to the MSC. Therefore, a need exists for a method for reducing status reporting within a wireless communication system.

SUMMARY OF THE INVENTION

According to an aspect of the present invention, the foregoing need is addressed by a method for reducing status reporting in a wireless communication system. Such a system includes a mobile switching center, a base station controller, and a plurality of base transceiver stations. The method includes receiving from a mobile station, a mobile communication signal, and based on the mobile communication signal, invoking delivery of an information element to the base station controller. The method further includes, based on information element, selectively forwarding by the base station controller a status message to the mobile switching center. In addition, the method includes acknowledging, by the base station controller, successful receipt of the information element.

According to another aspect of the present invention, a method for reducing status reporting in a wireless communication system is disclosed. Such a system includes a mobile switching center, a first base site including a first base station controller with an associated plurality of base transceiver stations, and a second base site including a second base station controller with an associated plurality of base transceiver stations. The method includes receiving from a mobile station, a mobile communication signal, and assigning by the first base station controller, the mobile communication signal to one of its associated plurality of base transceiver stations. The method further includes reassigning by the mobile switching center, the mobile communication signal, to one of the plurality of base transceiver stations associated with the second base station controller. Based on the mobile communication signal reassignment, invoking delivery of an information element to the second base station controller. The method further includes, based on information element, selectively forwarding by the second base station controller a status message to the mobile switching center. In addition, the method includes acknowledging, by the second base station controller, successful receipt of the information element.

BRIEF DESCRIPTION OF THE DRAWINGS

FIG. 3 is an example of a bit map utilized to define the specific conditions under which a Handoff Performed message will be forwarded to an MSC, according to a preferred embodiment of the present invention.

DETAILED DESCRIPTION OF THE PREFERRED EMBODIMENT

Figure 1:
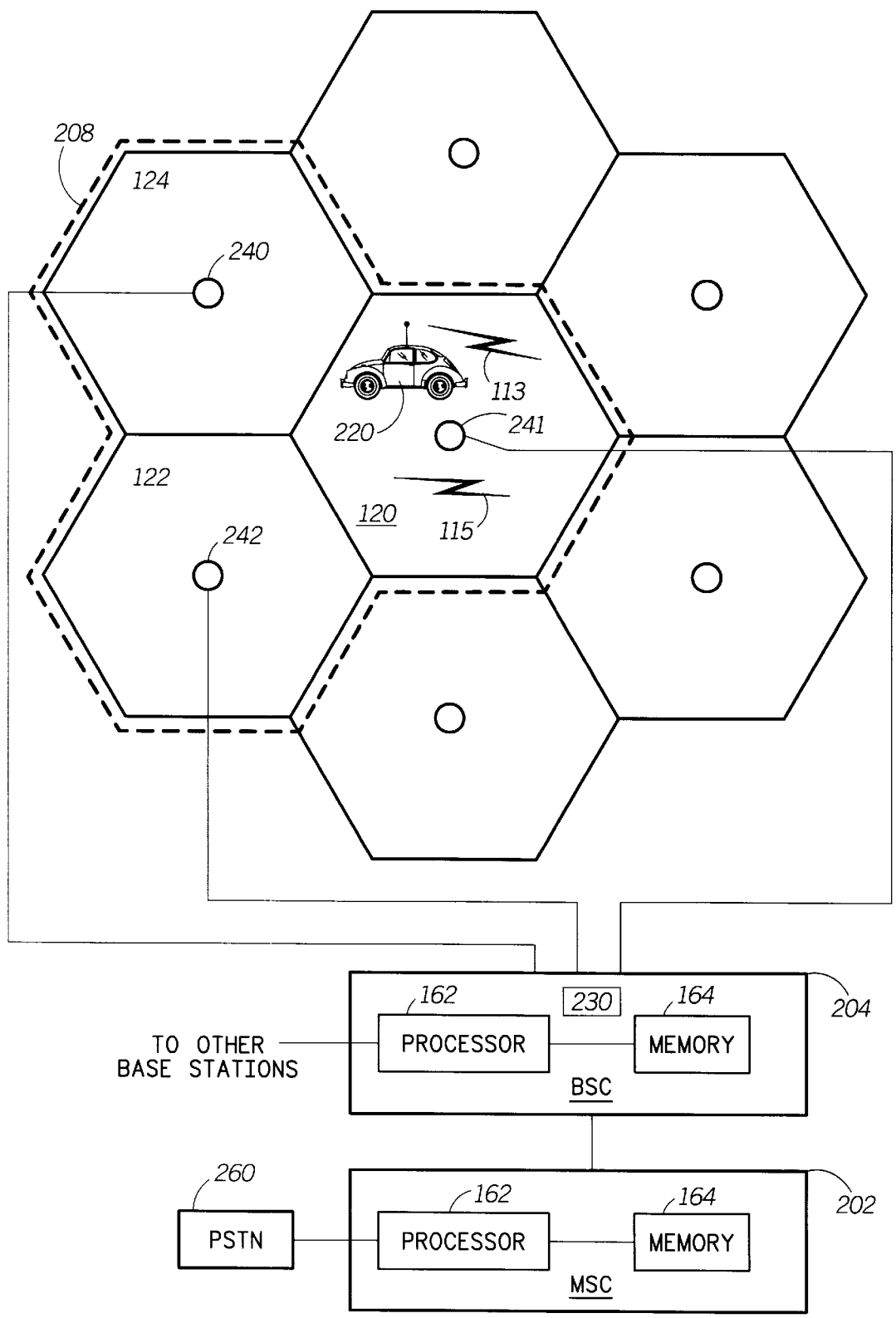
FIG. 1 depicts a wireless communication system configuration in which a method for reducing status reporting may be performed according to a preferred embodiment of the present invention.

Turning now to the drawings, wherein like numerals designate like components, FIG. 1 illustrates a typical wireless communication system 100. Communication system 100 preferably comprises a direct sequence code division multiple access (DS-CDMA) cellular communication system, such as that set forth in the Telecommunications Industry Association Interim Standard 95A (TIA IS-95A).

Communication system 100 includes base transceiver stations 240, 241 and 242 and one or more mobile stations although only one mobile station 220 is shown. Base transceiver stations 240, 241 and 242 communicate with mobile station 220 operating within cell area 120 served by base station 241. Cell areas 122 and 124 are served by base stations 242 and 240, respectively. Cell areas 120, 122 and 124 served by base transceiver stations 240–241 represent a first coverage area 208. Base transceiver stations 240, 241 and 242, are coupled to a central Base Station Controller (BSC) 204, which includes among other things, a processor 162, a memory 164, and an information element 230 (discussed below). A mobile switching center (MSC) 202, also including a processor 162 and a memory 164, is coupled to BSC 204 as well as to the public switched telephone network (PSTN) 260 using known techniques. BSC and MSC operate according to well known methods and are commercially available from Motorola, Inc.

Multiple access wireless communication between base stations 240, 241, 242 and mobile station 220 occurs via radio frequency (RF) channels which provide physical paths over which digital communication signals such as voice, data, and video are transmitted. Base-to-mobile station communication are said to occur on a forward-link channel, while mobile-to-base station communications are referred to as being on a reverse-link channel. A communication system using CDMA channelization is described in detail in TIA/EIA Interim Standard IS-95A, Mobile Station-Base Station Compatibility Standards for Dual-Mode Wideband Spread Spectrum Cellular Systems, telecommunications Industry Association, Washington, D.C. July 1993 [IS-95A], and TIA Telecommunications systems Bulletin: Support for 14.1 kbps Data Rate and PCS Interaction for Wideband Spread Spectrum Cellular Systems", February 1996 [the Bulletin].

As shown in FIG. 1, communication signal 113 has been transmitted on an IS-95 forward-link channel such as a Paging Channel or a Traffic Channel by base station 241 to mobile station 220. Communication signal 115 has been transmitted via an IS-95 reverse-link channel such as an Access Channel or a Traffic Channel by mobile station 220 to base station 241. The IS-95A forward- and reverse-link channel has been specifically referred to herein, but the present invention is applicable to any digital channel, including but not limited to the forward link IS-95A channel and to all forward- and reverse-link TDMA channels, in all TDMA systems such as Groupe Special Mobile (GSM), a European TDMA system, Pacific Digital Cellular (PDC), a Japanese TDMA system, and Interim Standard 54 (IS-54), a U.S. TDMA system.

Figure 4:
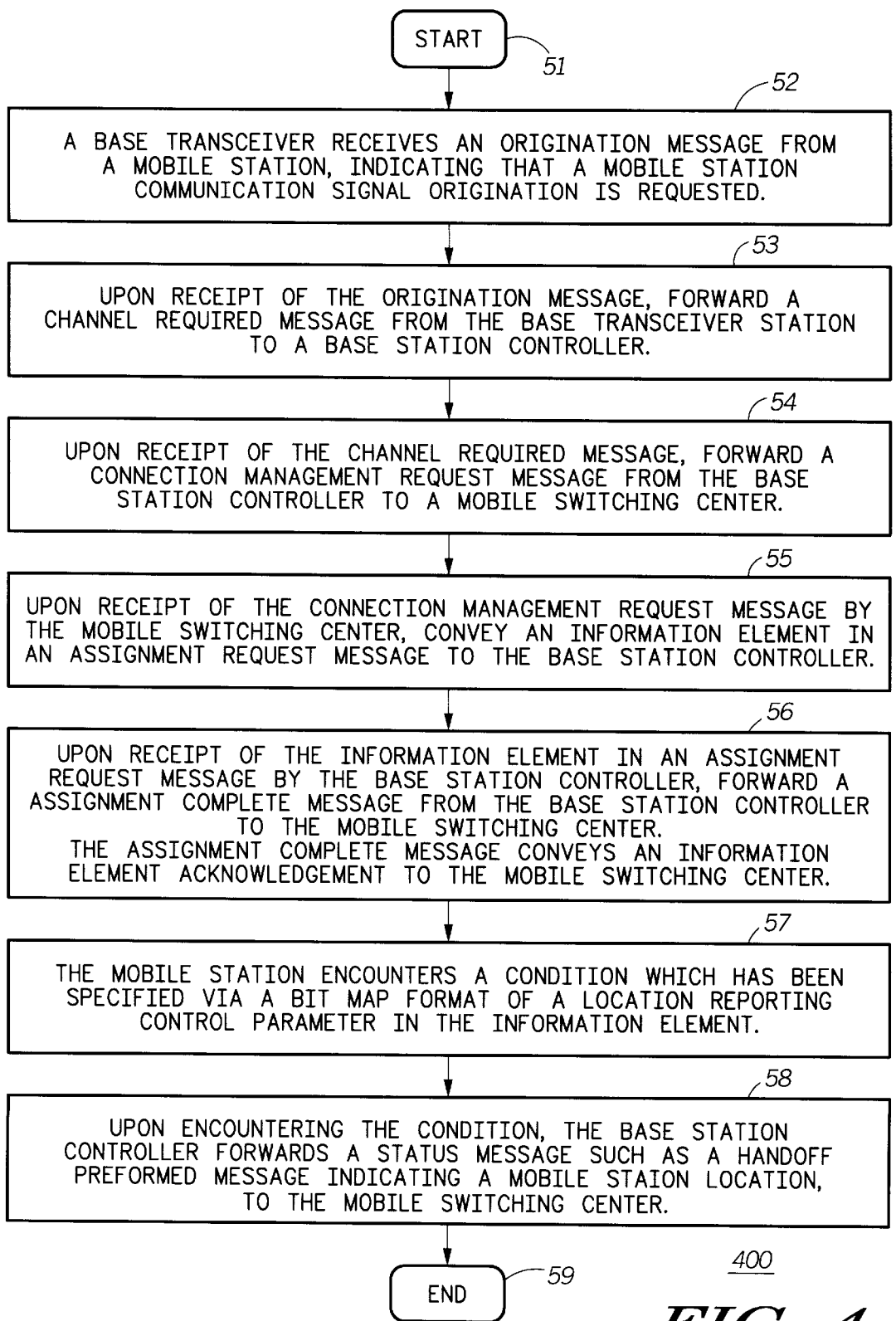
FIG. 4 is a flow chart which illustrates a method for reducing status reporting within the wireless communication system depicted in FIG. 1., according to a preferred embodiment of the present invention.

In FIG. 4, a flow chart representing a method wherein information element 230 is delivered to BSC 204 during a call set-up, generally designated 400, for reducing status reporting within the wireless communication system depicted in FIG. 1.

Method 400 starts at step 52 where a base transceiver station, such as BTS 241, receives an Origination message from mobile station 220, indicating that origination of a mobile station communication signal 115 is requested. In response, BTS 241 forwards a Channel Required message to BSC 204, at block 53. Upon receipt of the Channel Required message, BSC 204 forwards a Connection Management Request message to MSC 202, at block 54.

Next, at block 55, MSC 202 responds to the received Connection Management Request message with an Assignment Request message sent to BSC 204. The Assignment Request message includes an information element, which when received by BSC 204, causes BSC 204 to selectively forward status messages, such as the subscriber location, to MSC 202. Information element 230 selectively forwards status messages to MSC 202 when specific conditions are encountered, thus limiting messaging between BSC 204 and MSC 202.

Next, at block 56, BSC 204 acknowledges receipt of information element 230 to MSC 202 via an Assignment Complete message. The Assignment Complete message includes an information element acknowledgment, which when received by MSC 202, confirms that BSC 204 will forward status messages to MSC 202 under specific conditions. The information element acknowledgment may be an "echo" of the information element sent from MSC 202.

In the preferred embodiment, information element 230 comprises a Location Reporting Control parameter. The Location Reporting parameter consists of a bit map which is arranged to define the specific conditions which cause status messages to be forwarded to MSC 202. The bit map specifies the conditions for controlling and/or limiting the amount of status message which are to be sent between BSC 204 and MSC 202, via assigning a predefined, condition bits to a value of one or zero. For example, a predefined condition may include forwarding a location of MS 220 to MSC 202, via a Handoff Performed message, the Handoff Performed message confirming the handoff of a mobile station signal 115 from a first coverage area to a second coverage area.

FIG. 3 illustrates an example of the bit map format utilized in information element 230 which defines the specific conditions under which a status message, such as a Handoff Performed message, will be forwarded from base site 203 to MSC 202. In this example, the Handoff Performed message includes a location of mobile station 202. The format of information element 230 is a seven octet information parameter. It includes an information element identifier 402 in the first octet which defines the rules for interpreting the parameter information, and an information element length 404 in the second octet. The bits comprising octets 3–5, including bits 405–428, may be referred to as condition bits. Condition bits 405–428 are arranged to control and/or limit the amount of status messages which are to be sent between BSC 204 and MSC 202. The control is accomplished via selecting a value of either one or zero for each of the assigned condition bits. For example, an always send condition bit 412 represents the "always send" condition which, when activated, instructs BSC 204 to always send mobile location update messages to MSC 202 when a handoff occurs. Similarly, a never send condition bit 411 represents the "never send" condition which, when activated, instructs BSC 204 to refrain from sending a mobile location update message to MSC 202 when a handoff occurs. Further condition bits include a cell change condition bit 410, a sector change condition bit 409, a E911 condition bit 408, a wiretap condition bit 407, a mobile service area (MSA) change condition bit 406, a mobile billing area (MBA) change condition bit 405, a network ID (NID) change condition bit 420, a system ID (SID) change condition bit 419, a location area condition bit 418, a distance condition bit 417, a timer condition bit 416, a reference cell condition bit 415, and a reference sector condition bit 414. Spare bits are provided, for example spare condition bits 413, 426, 427, and 428, for future feature expansion. Further, condition bits 422–425 are reserved for proprietary vendor specific features. Additional octet fields, a distance parameter field 456 and a timer parameter field 456, are also used to further specify conditions for controlling and/or limiting the amount of status messages sent. Thus, providing a BSC such as BSC 204 with information element 230, allows the BSC to control when status messages are to be sent between BSC 204 and MSC 202.

Figure 2:
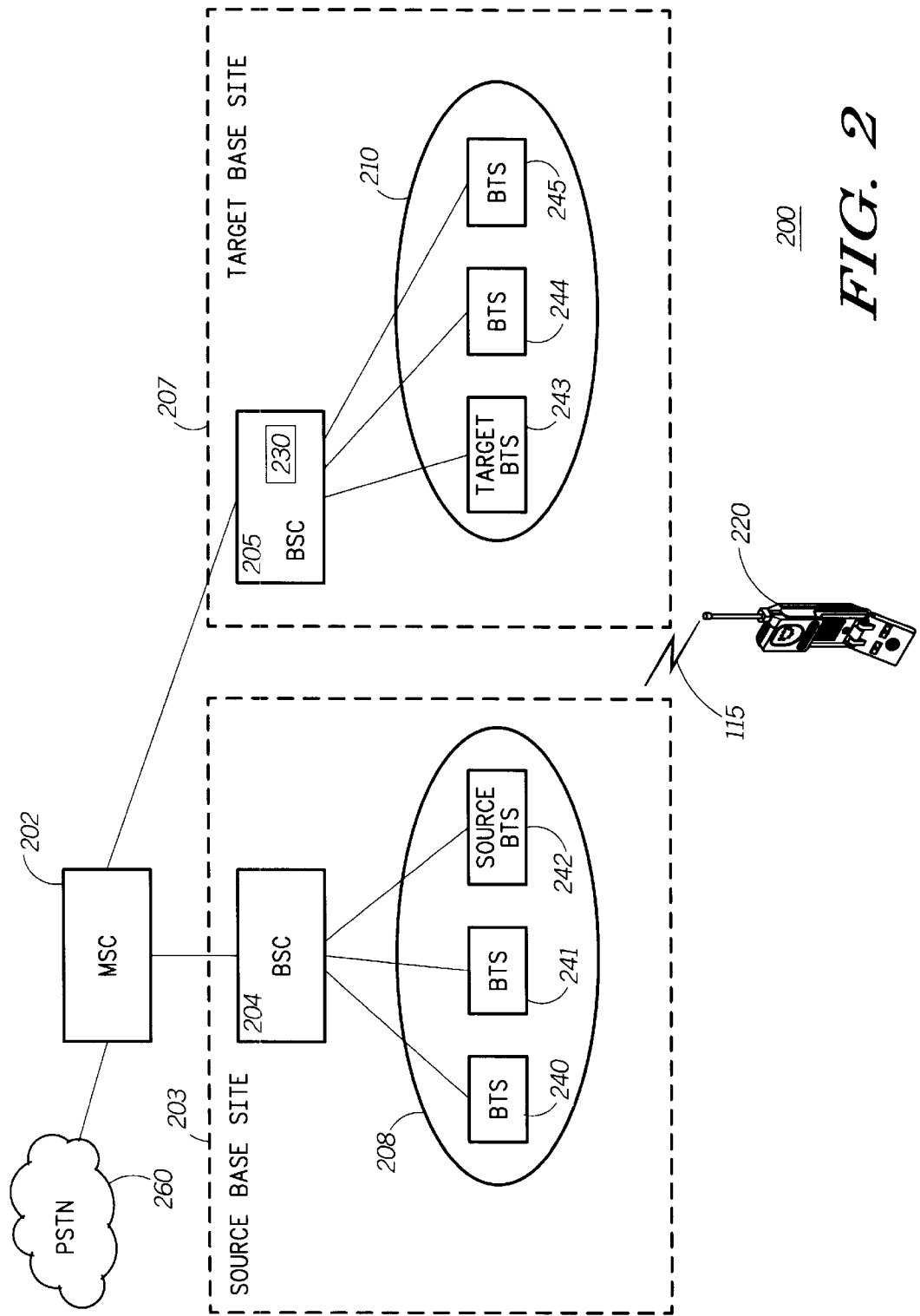
FIG. 2 depicts a wireless communication system configuration in which a method for reducing status reporting may be performed according to an alternate embodiment of the present invention.

FIG. 2 depicts a wireless communication system configuration suitable for illustrating a method for reducing status reporting, according to an alternate embodiment of the present invention. Wireless communication system 200 includes a mobile switching center (MSC) 202, a first base station controller (BSC) 204 and a second base station controller 205. BSC 204 is in communication with a first plurality of base transceiver stations 240–241, serving a first coverage area 208. BSC 205 is in communication with a second plurality of base transceiver stations, 243–245, serving a second coverage area 210. For purposes of discussion, BSC 204 and its associated BTS' may be referred to as a source base site 203, while BSC 205 and its associated BTS' may be referred to a target base site 207. A mobile station 220 is also shown.

Figure 5:
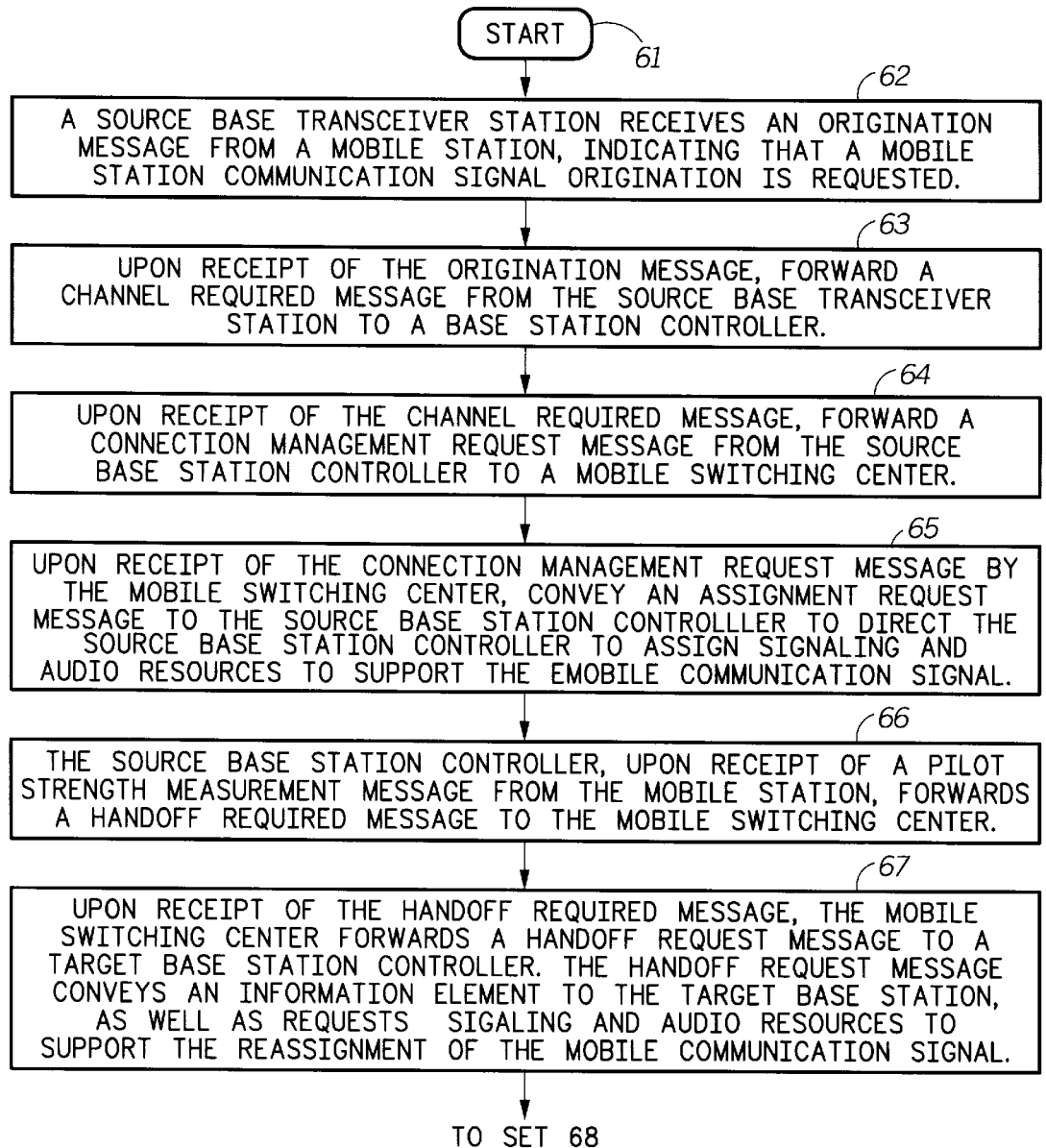
FIG. 5 is a flow chart which illustrates a method for reducing status reporting within the wireless communication system depicted in FIG. 2., according to an alternate embodiment of the present invention.
Figure 5A:
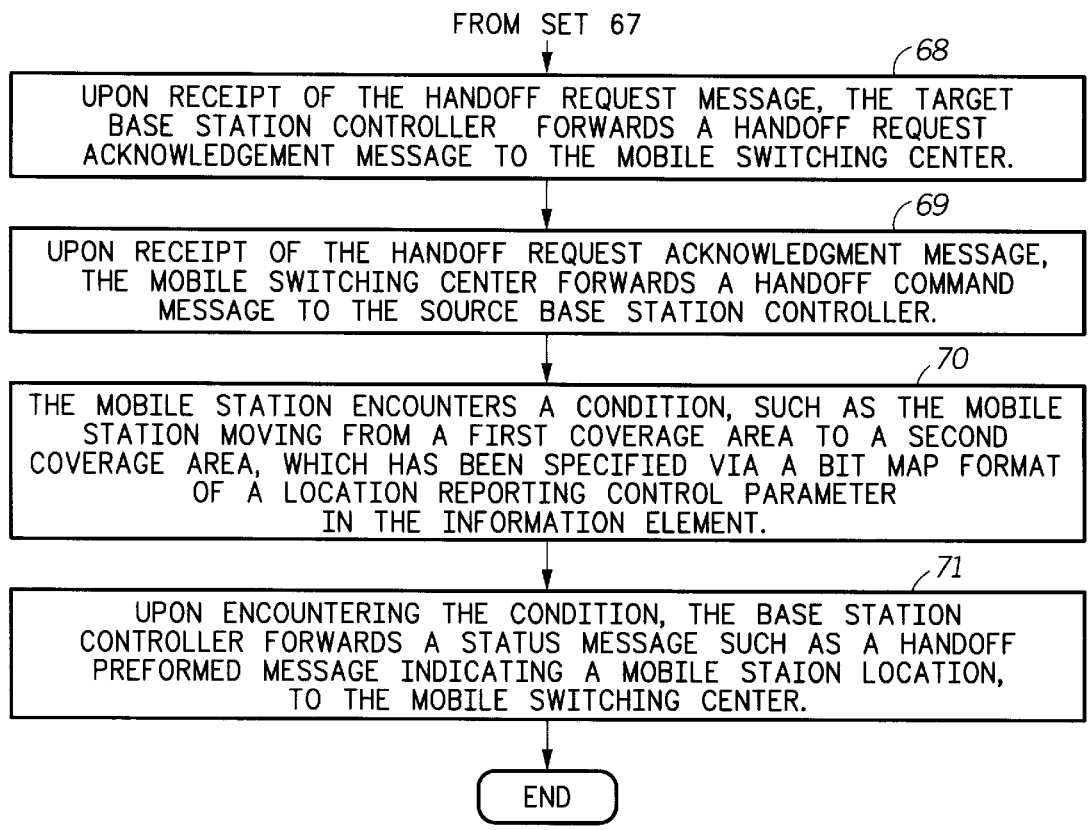

In FIG. 5, a flow chart representing an alternate method, generally designated 500, for reducing status reporting within the wireless communication system depicted in FIG. 2, is illustrated. FIG. 5 describes a method wherein information element 230 is delivered to BSC 205 of target base site 207 during an inter-BSC handoff of mobile station signal 115.

Method 500 starts at block 62 where a source base transceiver station, such as BTS 242, receives an Origination message from mobile station 220, indicating that origination of a mobile station communication signal 115 is requested. In response, source BTS 242 forwards a Channel Required message to BSC 204, at block 63. Upon receipt of the Channel Required message, BSC 204 forwards a Connection Management Request message to MSC 202, at block 64. Next, at block 65, MSC 202 responds to the received Connection Management Request message with an Assignment Request message sent to BSC 204. Based on mobile communication signal strength measurements, BSC 204 assigns signaling and audio resources required to support mobile communication signal 11 to source BTS 242.

As mobile station 220 travels away from a first coverage area 208 served by source base site 203, BSC 204 notes that mobile station 220 is entering a second coverage are 210 served by target base site 207. Upon receipt of communication signal strength measurement messages such as a Pilot Strength Measurement message from mobile station 220, BSC 204 notifies MSC 202, via a Handoff Required message, to reassign signaling and audio resources required to support mobile communication signal 115, at block 66.

In response to the Handoff Required message, MSC 202 sends a Handoff Request message to a target base station controller, such as BSC 205 at target base site 207, at block 67. Because the areas served by source base site 203 and target base site 207 were preselected to define a first coverage area 208 and second coverage area 210, the Handoff Request message included an information element 230. Information element 230, which when received by target base site 207, causes BSC 205 to selectively forward status messages to MSC 202. Information element 230 selectively forwards status messages to MSC 202 under specific conditions discussed in connection with FIG. 3, thus limiting messaging between BSC 205 and MSC 202.

Next, at block 68, BSC 205, upon receipt of the Handoff Request message, BSC 205 forwards a Handoff Request Acknowledgment message to MSC 202 in order to acknowledge receipt of information element 230. The Handoff Request Acknowledgment message sent to MSC 202 by BSC 205, includes an information element acknowledgment, which when received by MSC 202, confirms that target base site 207 will forward status messages to MSC 202 under specific conditions. Next, at block 69, upon receipt of the Handoff Request Acknowledgment message, MSC 202 forwards a Handoff Command message to BSC 204.

In the alternate embodiment, information element 230 consists of a Location Reporting Control parameter in which a bit map is utilized to define the specific conditions under which status messages, for example Handoff Performed messages indicating the location of mobile station 220, will be forwarded to MSC 202. In method 500, the specific condition of mobile station 220 traveling from a predetermined first coverage area to a predetermined second coverage invoked the delivery of information element 230. Subsequently, at block 71, BSC 205, forwarded a mobile station location message to MSC 202, and then continued to selectively forward mobile station location messages during the time span of mobile communication signal 115.

Similarly, in a third embodiment, information element 230 may be delivered to BSC 204 during an intra-BSC handoff of mobile communication signal 115.

As is described herein, numerous specific conditions may be defined in which information element 230 is delivered to base station system resulting in a subsequent reduction of messages sent to a central mobile switch. In addition, the principles of the present invention can also be applied to existing messages, as well as messages developed for future use between the base station system and the central mobile switch of a wireless communication system. Likewise, the principles of the present invention which apply to all types of digital radio frequency channels also apply to other types of communication channels, such as radio frequency signaling channels, electronic data buses, wireline channels, optical fiber links and satellite links.

While the invention has been particularly shown and described with reference to a number of embodiments, it will be understood by those skilled in the art that various changes in form and details may be made therein without departing from the spirit and scope of the invention.

What we claim is:

1. In a wireless communication system, said system including a mobile switching center, a base station controller, and a plurality of base transceiver stations, a method for reducing status reporting to said mobile switching center comprising:

receiving from a mobile station, a mobile communication signal;

based on the mobile communication signal, invoking delivery of location information to said base station controller; and based on said location information and a location reporting parameter, said base station controller selectively forwarding location information from said base station controller to said mobile switching center only when said base station controller detects a location change for the mobile station, wherein the location reporting parameter comprises a bit map which is arranged to define a specific condition that causes status messages to be forwarded.

2. The method according to claim 1, further comprising the step of forwarding an Assignment Complete message from said base station controller to said mobile switching center.

3. The method according to claim 2, wherein said Assignment Complete message comprises a information element acknowledgment, said information element acknowledgment confirming receipt of said information element by said base station controller to said mobile switching center.

4. In a wireless communication system, said system including a mobile switching center, a first base site including a first base station controller with an associated plurality of base transceiver stations, a second base site including a second base station controller with an associated plurality of base transceiver stations, a method for reducing status reporting to said mobile switching center comprising:

receiving from a mobile station, a mobile communication signal;

assigning, by said first base station controller, said mobile communication signal, to one of said associated plurality of base transceiver stations;

reassigning by said mobile switching center, said mobile communication signal, to one of said associated plurality of base transceiver stations associated with said second base station controller;

based on said mobile communication signal reassignment, invoking delivery of a mobile station location to said second base station controller;

based on said mobile station location and a location reporting parameter, said second base station controller selectively forwarding a status message from said second base station controller to said mobile switching center only when said second base station controller detects a location change of said mobile station from a first coverage area to a second coverage area, wherein the location reporting parameter comprises a bit map which is arranged to define a specific condition that causes status messages to be forwarded; and acknowledging, by said second base station controller, successful receipt of said information element.

* * * * *